United States Patent [19]

Rizzuto

[11] 4,243,307
[45] Jan. 6, 1981

[54] IMAGE PROJECTION SYSTEM

[76] Inventor: Dennis Rizzuto, 162-31 9th Ave., Whitestone, N.Y. 11357

[21] Appl. No.: 968,486

[22] Filed: Dec. 11, 1978

[51] Int. Cl.³ .............................................. G03B 21/16
[52] U.S. Cl. ..................................... 353/57; 353/119
[58] Field of Search ................. 353/119, 121, 122, 74, 353/71, 57, 58, 61, 76, 77, 78; 350/117; 248/11, 653, 638, 669; 352/104, 242, 243

[56] References Cited

U.S. PATENT DOCUMENTS

| 1,776,110 | 9/1930 | Dina | 352/243 X |
|---|---|---|---|
| 1,929,626 | 10/1933 | DeForest | 352/35 |
| 2,477,923 | 8/1949 | Fitt | 353/119 X |
| 3,020,798 | 2/1962 | Chrisman | 353/119 X |
| 3,391,601 | 7/1968 | Santandrea | 353/94 |
| 3,762,814 | 10/1973 | Kitch | 353/58 X |
| 3,861,792 | 1/1975 | Donati | 353/122 X |
| 4,012,133 | 3/1977 | Burton | 353/77 X |
| 4,131,346 | 12/1978 | Dieckhoff | 353/61 |

Primary Examiner—Harry N. Haroian
Attorney, Agent, or Firm—Daniel Jay Tick

[57] ABSTRACT

A housing has a front with a window therein. A shock mounting device in the housing is affixed to the bottom thereof. A projector support device extends from the shock mounting device. A securing device releasably secures the slide projector to the projector support device in a manner whereby the slide projector is selectively adjustable in position relative to the bottom of the housing and light transmitted from the slide projector is transmitted through the window. Electrical conductors extend through the housing and are electrically connected to the slide projector for supplying electrical energy for energizing the projector. A screen spaced from the front of the housing receives light transmitted from the slide projector and presents an enlarged reproduction of an image on a slide in the slide tray of the slide projector.

7 Claims, 6 Drawing Figures

SCREEN 26

ALUMINUM 49

METAL EMBOSSED POLYVINYL SCREEN 26

IMAGE PROJECTION SYSTEM

BACKGROUND OF THE INVENTION

The present invention relates to an image projection system. More particularly, the invention relates to an image projection system having a slide projector with a slide tray and a lamp housing.

The principal object of the invention is to provide an image projection system for projecting images on a screen in a high ambient light environment such as, for example, a subway platform, a bus terminal, a commercial establishment of any type, and the like.

An object of the invention is to provide an image projection system of simple structure, which projects an image with considerable brightness and high fidelity and is thus highly suitable for the continuous projection of advertising material on a screen.

Another object of the invention is to provide an image projection system, which is inexpensive in manufacture, installed with facility and convenience, and provides a sustained high level of dependability with little or no maintenance required.

Still another object of the invention is to provide an image projection system which functions efficiently, effectively and reliably to project an image on a screen under all types of adverse conditions, including high moisture levels, sub-freezing temperatures, very high temperatures, considerable particle pollution in the atmosphere such as, for example, dust and fluid particles, and the like.

Yet another object of the invention is to provide an image projection system of simple structure,, which is inexpensive in manufacture, adjustable with facility, convenience and rapidity for projection on a desired screen spaced therefrom, and is highly resistant to vandalism.

Another object of the invention is to provide an image projection system which is especially suitable for operation on a subway platform wherein it projects an image with very high fidelity and accuracy regardless of the fact that it is almost continuously subjected to very high vibrations and must project through a hostile environment including considerable metallic particles and fluid particles.

Still another object of the invention is to provide an image projection system which is esthetically pleasing in appearance and utilizes a screen which may be cleaned with great vigor and with high pressure water streams without damage to such screen.

Yet another object of the invention is to provide an image projection system which is readily removable without damage or disruption to a supporting structure thereof.

Another object of the invention is to provide an image projection system utilizing a modular system of electronic components facilitating an on-location maintenance program, since it permits major electronic assemblies to be conveniently and rapidly removed and replaced with minimal interruption of the material being projected, so that the major components may be repaired or maintained in a shop.

Still another object of the invention is to provide an image projection system having a plurality of safeguards for preventing accidents due to the high voltage required to energize the lamp of the projection system.

Yet another object of the invention is to provide an image projection system for projecting images on a screen from a point or points spaced a distance in front of the screen in a high ambient light environment with great clarity, brightness, light gain and fidelity of reproduction.

Another object of the invention is to provide an image projection system for projecting images on a screen from a point or points spaced a distance behind the screen in a high ambient light environment with great clarity, brightness, light gain and fidelity of reproduction.

Still another object of the invention is to provide an image projection system for projecting images on a screen at predetermined times for predetermined periods of time.

Yet another object of the invention is to provide an image projection system for projecting images of art and graphic material on a screen with high fidelity in adherence with a prescribed aperture standard, so that a standard is created by which all utilized visuals retain uniform focus.

BRIEF SUMMARY OF THE INVENTION

In accordance with the invention, an image projection system having a slide projector with a slide tray and a lamp housing comprises a system housing having a bottom, a top, a front, a back and sides. The front has a window therein. A shock mounting device in the system housing is affixed to the bottom thereof. A projector support device extends from the shock mounting device. A securing device releasably secures the slide projector to the projector support device in a manner whereby the slide projector is selectively adjustable in position relative to the bottom of the system housing and light transmitted from the slide projector is transmitted through the window. An electrically conductive device extends through the system housing and is electrically connected to the slide projector for supplying electrical energy for energizing the projector. A screen spaced from the front of the system housing receives light transmitted from the slide projector and presents an enlarged reproduction of an image on a slide in the slide tray of the slide projector.

A Xenon lamp is provided in the lamp housing of the slide projector for producing a beam of light for transmission through a selected slide of the slide tray and through the window to the screen.

A first hole is formed through one of the front, back and one of the sides of the system housing. A dust filter is removably mounted in the system housing over the first hole. An intake fan is mounted in the system housing over the first hole for drawing outside air into the system housing through the first hole and the dust filter. A second hole is formed through one of the front, back and the other of the sides of the system housing and an exhaust blower is mounted in the system housing over the second hole for drawing air out of the system housing through the second hole.

A timing device is interconnected in the electrically conductive device for controlling the operation of the slide projector to operate the slide tray thereof in a manner whereby slides in the slide tray are positioned for projection of their images onto the screen in a predetermined sequence for predetermined periods of time.

A plurality of spaced bolts extend substantially perpendicularly from spaced sides of the slide projector. The projector support device comprises a plurality of bracket members having upright parts extending substantially perpendicularly to the bottom of the system housing and substantially parallel to the sides of the slide projector. The upright part of each of the bracket members has a slot formed therethrough extending along its length substantially perpendicularly to the bottom of the housing for accommodating a corresponding one of the bolts of the slide projector. The securing device comprises a plurality of wing nuts each threadedly coupled to a corresponding one of the bolts for releasably securing the corresponding one of the bolts at a selected distance from the bottom of the system housing in the corresponding one of the upright parts.

A power supply housing is mounted on the top of the system housing and has first and second spaced opposite walls each with a hole formed therethrough. A disposable dust filter is removably mounted in the power supply housing over the hole of one of the first and second walls. An exhaust fan is mounted in the power supply housing over the hole of the other of the first and second walls for drawing air out of the housing through the hole of the other of the walls.

A power supply is mounted in the power supply housing and has first and second spaced opposite walls in spaced proximity with the first and second walls, respectively, of the power supply housing each with a hole formed therethrough. A suction fan is mounted in the power supply over the hole of the wall thereof in proximity with the wall of the power supply housing having the dust filter mounted thereon for drawing outside air into the power supply through the dust filter and the hole of the wall in which the suction fan is mounted.

A screen mounting device has a plurality of screen mounting brackets at the corners of a rectangle and extends along diagonal lines of the rectangle. The metal sheet is affixed to the screen mounting brackets. Each of a pair of reinforcing rods extends along a diagonal of the rectangle and joins the corresponding pair of screen mounting brackets extending along the diagonal line.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
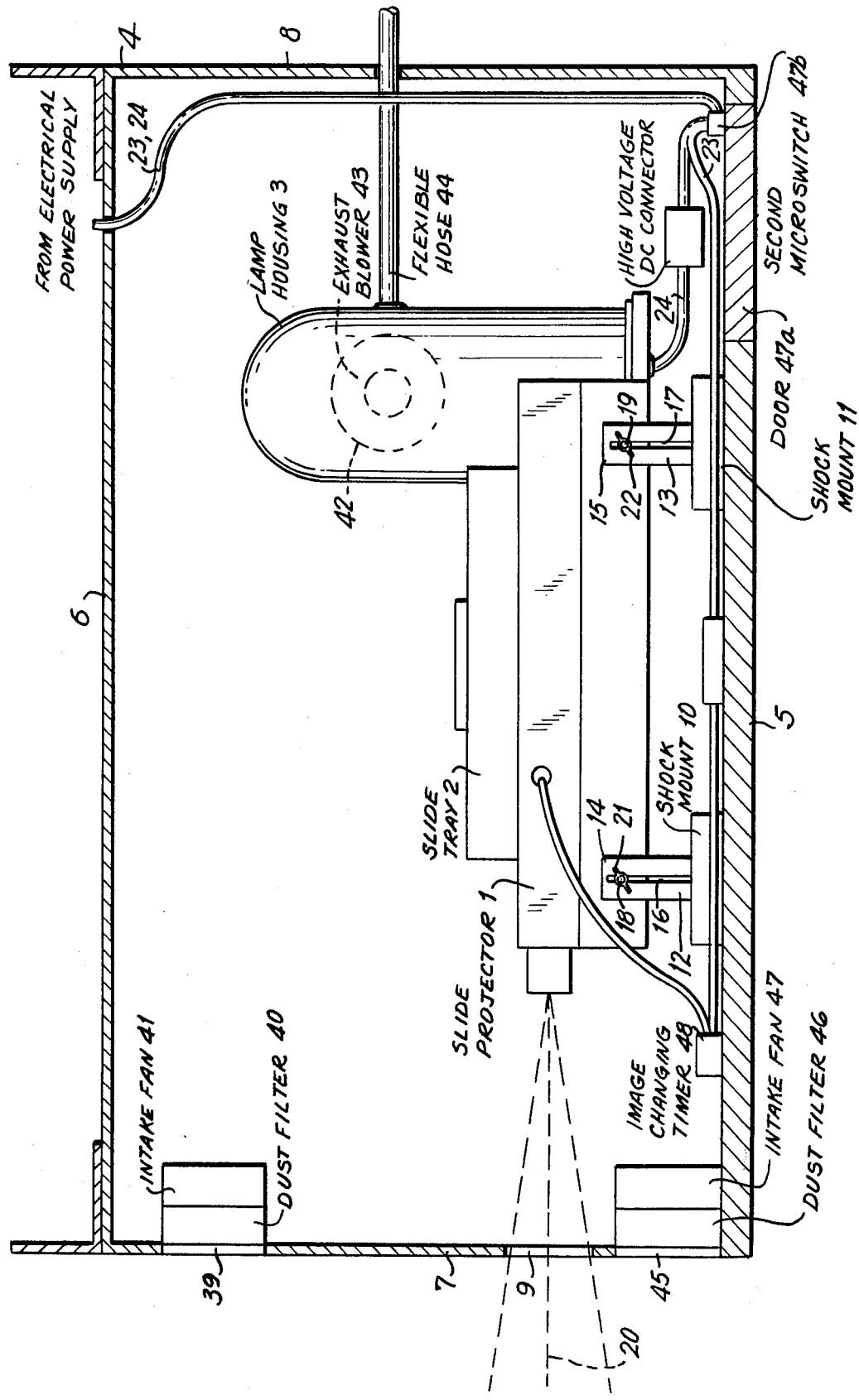
FIG. 1 is a view, partly in section, of an embodiment of the image projection system of the invention, without the power supply.

The image projection system of the invention has a slide projector 1, a slide tray 2 and a lamp housing 3, as shown in FIG. 1. The slide projector, slide tray and lamp housing may comprise any suitable known apparatus. Thus, for example, the slide projector 1 and the slide tray 2 preferably comprise the Kodak Carousel projector manufactured by the Kodak Company of Rochester, N.Y., and the lamp housing may comprise any suitable known housing for a Xenon lamp such as, for example, the Atlantic model EKX-40 manufactured by the Atlantic Audio-Visual Corporation of New York, N.Y.

The slides are mounted in high-heat pin registered plastic and glass slide mounts. This creates a standard by which art and graphic material may be reproduced or projected on a screen in adherence with a prescribed aperture standard. This also creates a standard by which all utilized visuals retain uniform focus.

The image projection system of the invention comprises a system housing 4 (FIGS. 1 and 2) having a bottom 5, a top 6, a front 7 and a back 8 (FIG. 1). The system housing 4 also has sides, which are not shown in the FIGS. The front 7 of the system housing 4 has a window 9 therein.

A shock mounting device is provided in the system housing 4 and affixed to the bottom 5 thereof. The shock mounting device comprises a pair of shock mounts 10 and 11. The shock mounts 10 and 11 preferably include resilient material such as, for example, rubber and springs. A projector support device extends from the shock mounting device. The projector support device comprises a plurality of projector supports or bracket members 12 and 13, respectively, extending substantially perpendicularly to the bottom 5 of the system housing 4 and substantially parallel to the sides of the slide projector 1. The upright parts 14 and 15 of the bracket members 12 and 13, respectively, have slots 16 and 17, respectively, formed therethrough. The slot 16 extends along the length of the upright part 14 substantially perpendicularly to the bottom 5 of the system housing 4 and accommodates a bolt 18 extending substantially perpendicularly from a side of the slide projector 1 (FIG. 1). The slot 17 of the upright part 15 extends along the length of said upright part substantially perpendicularly to the bottom 5 of the system housing 4 and accommodates a bolt 19 extending substantially perpendicularly from a side of the slide projector 1 in spaced relation with the bolt 18 (FIG. 1).

A securing device releasably secures the slide projector 1 to the projector support device 12, 13 in a manner, shown in FIG. 1, whereby said slide projector is selectively adjustable in position relative to the bottom 5 of the system housing 4 and light 20 (FIG. 1) transmitted from said slide projector is transmitted through the window 9. The securing device comprises a plurality of wing nuts 21 and 22. The wing nut 21 is rotatably coupled to the bolt 18 and releasably secures said bolt at a selected distance from the bottom 5 of the system housing 4 in the upright part 14 (FIG. 1). The wing nut 22 is threadedly coupled to the bolt 19 for releasably securing said bolt at a selected distance from the bottom 5 of the system housing 4 in the upright part 15 (FIG. 1). The slide projector 1 may thus be positioned, as desired, by loosening the wing nuts, shifting said slide projector in position, as desired, and tightening the wing nuts in the new position of said slide projector.

Electrical conductors 23 and 24 (FIGS. 1 and 2) extend through the system housing 4 and are electrically connected to the slide projector for supplying electrical energy for energizing said projector. The electrical conductor 23 extends from a power supply 25 (FIG. 2) to the slide projector 1 and various fans, hereinafter described, and conducts AC. The electrical conductor 24 extends from the power supply 25 (FIG. 2) to a lamp in the lamp housing 3 and conducts DC of high voltage to energize said lamp.

A Xenon lamp (not shown in the FIGS.) is provided in the lamp housing 3 of the slide projector and produces a high intensity, reliable and continuous beam of light for transmission through a selected slide of the slide tray 2 and through the window 9, as shown in FIG. 1, to a screen 26 (FIGS. 3 to 6).

Figure 2:
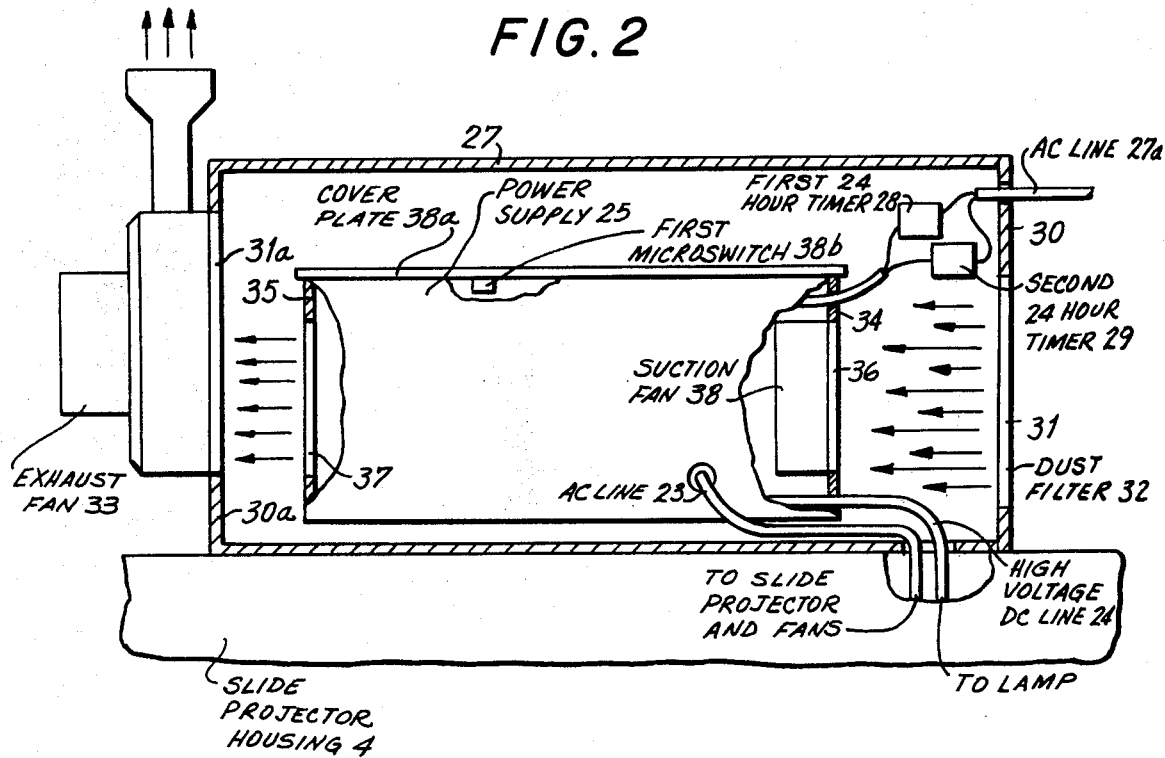
FIG. 2 is a view, partly cutaway and partly in section, of an embodiment of the power supply of the image projection system of the invention.

The power supply 25 is mounted in a power supply housing 27 mounted on the top 6 of the system housing 4, as shown in FIG. 2. The power supply 25 is supplied with electrical energy, via an AC line 27a, from any suitable source of electrical energy such as, for example, a commercial power source. A first 24 hour timer 28 of any suitable known type is connected in one of the electrical conductors of the AC line 27a. A second 24 hour timer 29 of any suitable known type is connected in the other of the electrical conductors of the AC line 27a. The first and second 24 hour timers 28 and 29 control the operation of the power supply 25 so that the slide projector 1 projects an image on the screen 26 at predetermined times for predetermined periods of time such as, for example, at times of peak commuter and pedestrian traffic such as, for example, between 7:00 A.M. and 11:30 P.M. each day. The first 24 hour timer 28 thus turns the power supply and air cooling blowers, hereinafter described, ON at 6:45 A.M., for example and OFF at 11:45 P.M., for example, and the second 24 hour timer 29 energizes the lamp of the slide projector 1 at 7:00 A.M., for example, and deenergizes said lamp at 11:30 P.M., for example. The power supply housing 27 has first and second spaced opposite walls 30 and 30a, respectively (FIG. 2). The first and second walls 30 and 30a of the power supply housing 27 have holes 31 and 31a, respectively, formed therethrough (FIG. 2).

A disposable dust filter 32 of any suitable known type is removably mounted in the power supply housing 27 over the hole 31 of the first wall 30 (FIG. 2). An exhaust fan 33 of any suitable known type is mounted in the power supply housing 27 over the hole 31a of the second wall 30a thereof and functions to draw air out of said power supply housing through said hole (FIG. 2).

The power supply 25 has first and second spaced opposite walls 34 and 35, respectively, in spaced proximity with the first and second walls 30 and 30a, respectively, of the power supply housing 27. A hole 36 is formed through the first wall 34 of the power supply 25 and a hole 37 is formed through the second wall 35 of said power supply, as shown in FIG. 2.

A suction fan 38 of any suitable known type is mounted in the power supply 25 over the hole 36 of the wall 34 and functions to draw outside air into said power supply through the dust filter 32 and said hole, as shown in FIG. 2.

Thus, the power supply 25 is continuously cooled by continuous flow of air drawn into the power supply housing 27 by the suction fan 38 and drawn out of said housing by the exhaust fan 33.

A cover plate 38a is provided on the power supply 25 and rests on a first microswitch 38b in said power supply. The first microswitch 38b is connected in the AC line 27a, so that if the cover plate 38a is lifted, said microswitch is opened and terminates the supply of electrical energy to the power supply 25.

A first hole 39 is formed through the front 7 of the system housing 4, as shown in FIG. 1. A dust filter 40 of any suitable known type is removably mounted in the system housing 4 over the first hole 39 (FIG. 1). An intake fan 41 of any suitable known type is mounted in the system housing over the first hole 39 and functions to draw outside air into said housing through said first hole and the dust filter 40. A second hole 42 is formed through one of the sides of the system housing 4 (not shown in the FIGS.). An exhaust blower 43 of any suitable known type is mounted in the system housing 4 over the hole 42 and functions to draw air out of said housing through said second hole.

The lamp housing 3 is preferably cooled in the usual manner and then circulated air is exhausted therefrom via a flexible hose 44 which extends through the back 8 of the system housing 4 to the area outside said housing (FIG. 1).

Another hole 45 is formed through the front 7 of the system housing 4 in spaced relation with the hole 39 therethrough. A dust filter 46 of any suitable known type is removably mounted in the system housing 4 over the additional hole 45, as shown in FIG. 1. Another intake fan 47 of any suitable known type is mounted in the system housing 4 over the additional hole 45 for drawing outside air into said housing through said additional hole and said additional dust filter 46 (FIG. 1). Thus, outside cooling air is drawn into the system housing 4 by the intake fan 41 or the intake fans 41 and 47 and is filtered, so that solid and liquid particles therein are removed therefrom by the dust filters 40 and 46. The cooling air is then drawn out of the system housing 4 by the exhaust blower 43.

The system housing 4 has a door 47a in its bottom 5. A second microswitch 47b mounted in the system housing 4 at the door 47a thereof and is connected in the electrical conductors 23, 24, so that when said door is opened, the supply of electrical energy to the slide projector 1 and its lamp is terminated.

A timer 48 of any suitable known type is interconnected in the electrical conductors, in the manner shown in FIG. 1, for controlling the operation of the slide projector 1 to operate the slide tray 2 thereof in a manner whereby slides in said slide tray are positioned for projection of their images onto the screen 26 in a predetermined sequence for predetermined periods of time. The timer 48 thus functions to change the image projected on the screen in accordance with a predetermined program.

Figure 6:
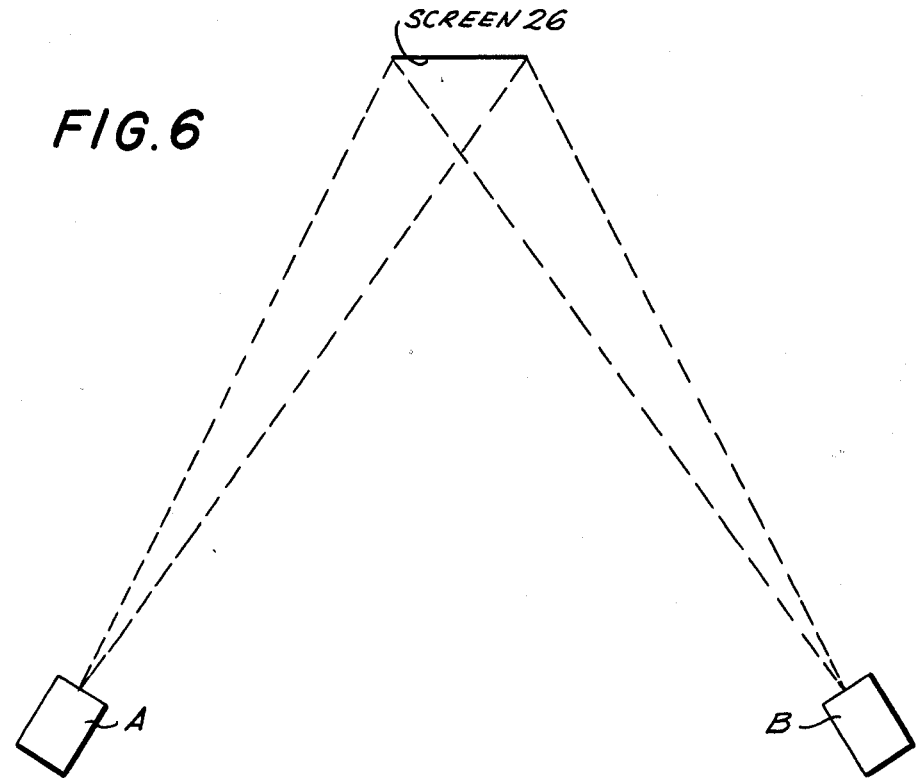
FIG. 6 is a schematic diagram illustrating a projection arrangement utilizing the image projection system of the invention.
Figure 3:
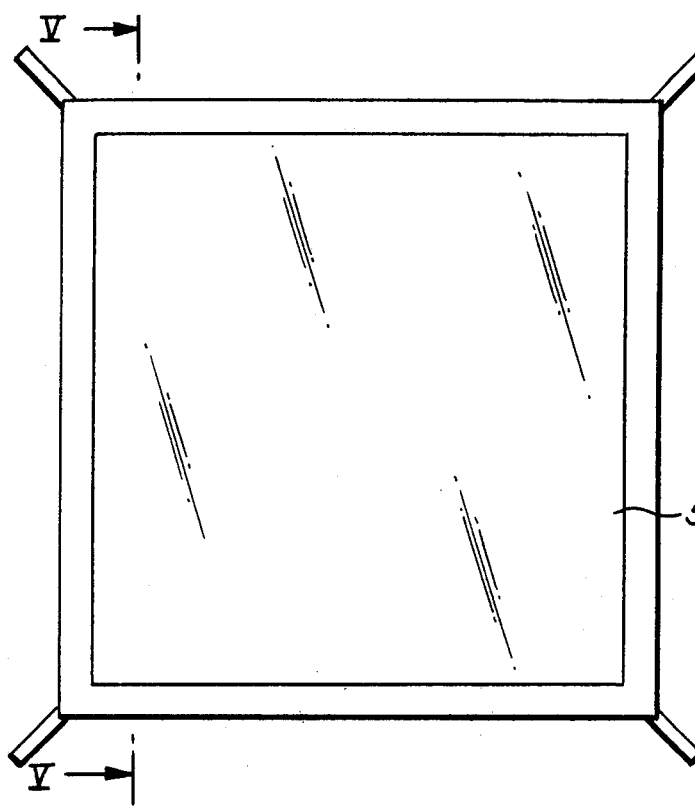
FIG. 3 is a front view, on a reduced scale, of an embodiment of the screen of the image projection system of the invention.

The screen 26 is spaced from the front 7 of the system housing 4 and receives light 20 transmitted from the slide projector 1. The screen 26 thus presents an enlarged reproduction of an image on a slide in the slide tray 2 of the slide projector 1. This is illustrated in FIG. 6, wherein two image projection systems of the invention A and B, respectively, project images simultaneously on the screen 26. This gives the impression to a viewer that the image is following him.

Figure 5:
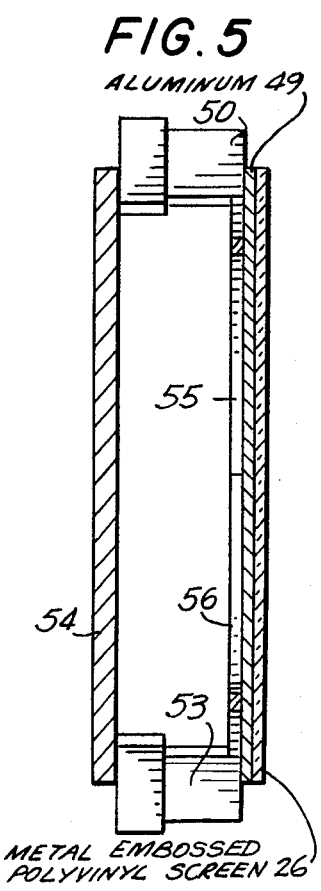
FIG. 5 is a cross-sectional view, taken along the lines V—V, of FIG. 3.

The screen 26 is extremely durable and able to withstand all types of abuse and severe cleaning operations, including high pressure water impingement without damage and without distortion of its image representation. The screen 26 comprises a metal embossed polyvinyl sheet mounted on an aluminum sheet 49, as shown in FIG. 5. The screen 26 reflects the light 20 transmitted from the slide projector 1 in a fan-shaped area with a brightness greater than twice that of a matte screen. An image represented by the screen 26 is not degraded by ambient light originating outside the beam of projected light, since such ambient light is rejected by said screen. The aforedescribed screen it utilized when the image is projected from a point or points spaced from the front of said screen.

The image may also be projected from a point or points spaced behind the screen. In such case, the screen is entirely composed of acrylic material and provides brightness levels previously unattainable via rear projection. The screen utilized for rear projection has a ⅜ inch thick surface comprising two layers. A smooth acrylic substance functions as the backing. The top layer, on which the image appears, comprises 12×8 inch lenticular lenses, very finely grooved. The brightness of the rear projected image is enhanced by blackening the tips of the lenticular ridges on the front surface thereby reducing the reflectivity of ambient light by the screen. Available brightness gains are between 2 and 6.

Figure 4:
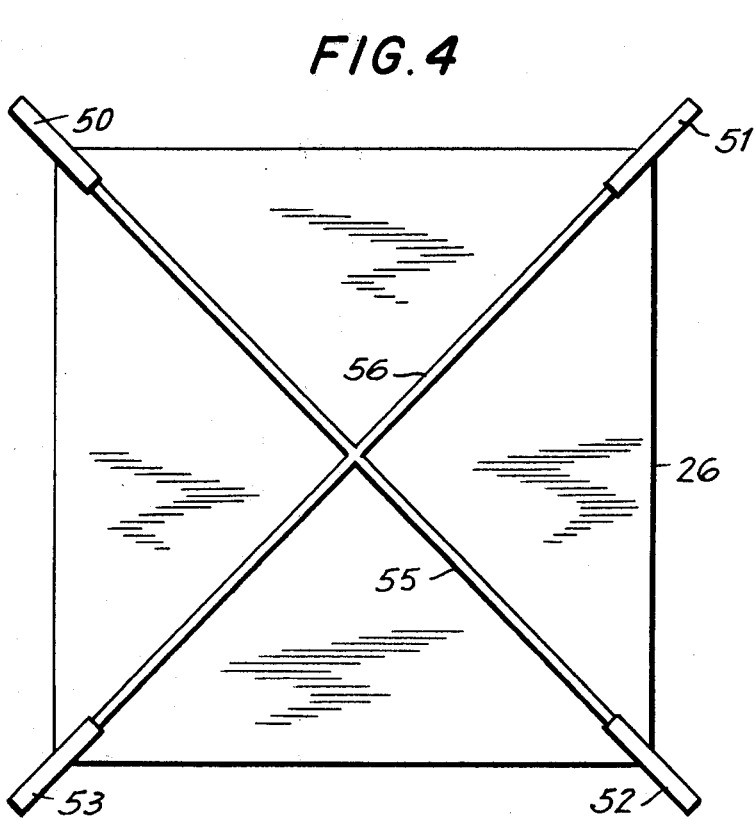
FIG. 4 is a rear view of the embodiment of FIG. 3.

As shown in FIGS. 4 and 5, a screen mounting device has a plurality of screen mounting brackets 50, 51, 52 and 53 mounted on steel beams 54 (FIG. 5) and positioned at the corners of a square forming the border of the back of the screen 26 (FIG. 4). The screen mounting brackets 50 to 53 extend along diagonal lines of the square and the aluminum sheet 49 is affixed to said screen mounting brackets. A pair of reinforcing rods 55 and 56 extend along the diagonals of the square, as shown in FIG. 4. The reinforcing rod 55 joins the pair of screen mounting brackets 50 and 52 extending along one of the diagonal lines of the square and the reinforcing rod 56 joins the screen mounting brackets 51 and 53 extending along the other diagonal line of the square, as shown in FIG. 4.

While the invention has been described by means of a specific example and in a specific embodiment, I do not wish to be limited thereto, for obvious modifications will occur to those skilled in the art without departing from the spirit and scope of the invention.

I claim:

1. An image projection system having a slide projector with a slide tray and a lamp housing, said image projection system comprising
   a system housing having a bottom, a top, a front, a back and sides, said front having a window therein;
   shock mounting means in said system housing affixed to the bottom thereof;
   projector support means extending from said shock mounting means;
   securing means for releasably securing the slide projector to said projector support means in a manner whereby said slide projector is selectively adjustable in position relative to said bottom of said system housing and light transmitted from said slide projector is transmitted through said window;
   electrically conductive means extending through said system housing and electrically connected to said slide projector for supplying electrical energy for energizing said projector;
   a screen spaced from the front of said system housing for receiving light transmitted from said slide projector and presenting an enlarged reproduction of an image on a slide in the slide tray of said slide projector;
   timing means interconnected in said electrically conductive means for controlling the operation of said slide projector to operate the slide tray thereof in a manner whereby slides in said slide tray are positioned for projection of their images onto said screen in a predetermined sequence for predetermined periods of time; and
   a power supply housing mounted on said system housing, said power supply housing having first and second spaced opposite walls each with a hole formed therethrough, a disposable dust filter removably mounted in said power supply housing over the hole of one of the first and second walls and an exhaust fan mounted in said power supply housing over the hole of the other of said first and second walls for drawing air out of said power supply housing through said hole of said other of said walls.

2. An image projection system as claimed in claim 1, further comprising a power supply mounted in said power supply housing and having first and second spaced opposite walls in spaced proximity with the first and second walls, respectively, of said power supply housing each with a hole formed therethrough and a suction fan mounted in said power supply over the hole of the wall thereof in proximity with the wall of said power supply housing having the dust filter mounted thereon for drawing outside air into said power supply through said dust filter and said hole of said wall on which said suction fan is mounted.

3. An image projection system as claimed in claim 2, further comprising power supply cooling means for cooling said power supply.

4. An image projection system having a slide projector with a slide tray, a lamp housing, sides and a plurality of spaced bolts extending from said sides, said image projection system comprising
   a system housing having a bottom, a top, a front, a back and sides, said front having a window therein;
   shock mounting means in said system housing affixed to the bottom thereof;
   projector support means extending from said shock mounting means, said projector support means comprising a plurality of members having upright parts extending substantially perpendicularly to the bottom of said system housing, the upright part of each of said members having a slot formed therethrough extending along its length for accommodating a corresponding one of the bolts of said slide projector;
   securing means for releasably securing the slide projector to said projector support means in a manner whereby said slide projector is selectively adjustable in position relative to said bottom of said system housing and light transmitted from said slide projector is transmitted through said window, said securing means comprising a plurality of nuts each threadedly coupled to a corresponding one of said bolts for releasably securing said corresponding one of said bolts at a selected distance from said bottom of said system housing in the corresponding one of said upright parts;
   electrically conductive means extending through said system housing and electrically connected to said slide projector for supplying electrical energy for energizing said projector;
   a screen spaced from the front of said system housing for receiving light transmitted from said slide projector and presenting an enlarged reproduction of an image on a slide in the slide tray of said slide projector;
   timing means interconnected in said electrically conductive means for controlling the operation of said slide projector to operate the slide tray thereof in a manner whereby slides in said slide tray are positioned for projection of their images onto said screen in a predetermined sequence for predetermined periods of time; and a power supply housing mounted on said system housing.

5. An image projection system having a slide projector with sides, a plurality of spaced bolts extending substantially perpendicularly from said sides, a slide tray and a lamp housing, said image projection system comprising a system housing having a bottom, a top, a front, a back and sides, said front having a window therein;

shock mounting means in said system housing affixed to the bottom thereof;

projector support means extending from said shock mounting means, said projector support means comprising a plurality of bracket members having upright parts extending substantially perpendicularly to the bottom of said system housing and substantially parallel to the sides of said slide projector, the upright part of each of said bracket members having a slot formed therethrough extending along its length substantially perpendicularly to said bottom of said system housing for accommodating a corresponding one of the bolts of said slide projector, and said securing means comprises a plurality of wing nuts each threadedly coupled to a corresponding one of said bolts for releasably securing said corresponding one of said bolts at a selected distance from said bottom of said system housing in the corresponding one of said upright parts;

securing means for releasably securing the slide projector to said projector support means in a manner whereby said slide projector is selectively adjustable in position relative to said bottom of said system housing and light transmitted from said slide projector is transmitted through said window;

electrically conductive means extending through said system housing and electrically connected to said slide projector for supplying electrical energy for energizing said projector; and a screen spaced from the front of said system housing for receiving light transmitted from said slide projector and presenting an enlarged reproduction of an image on a slide in the slide tray of said slide projector.

6. An image projection system having a slide projector with a slide tray and a lamp housing, said image projection system comprising a system housing having a bottom, a top, a front, a back and sides, said front having a window therein;

shock mounting means in said system housing affixed to the bottom thereof;

projector support means extending from said shock mounting means;

securing means for releasably securing the slide projector to said projector support means in a manner whereby said slide projector is selectively adjustable in position relative to said bottom of said system housing and light transmitted from said slide projector is transmitted through said window;

electrically conductive means extending through said system housing and electrically connected to said slide projector for supplying electrical energy for energizing said projector;

a screen spaced from the front of said system housing for receiving light transmitted from said slide projector and presenting an enlarged reproduction of an image on a slide in the slide tray of said slide projector; and screen mounting means having a plurality of screen mounting brackets at the corners of a rectangle and extending along diagonal lines of said rectangle, a metal sheet affixed to said screen mounting brackets, and a pair of reinforcing rods each extending along a diagonal of said rectangle and joining the corresponding pair of screen mounting brackets extending along said diagonal line.

7. An image projection system having a slide projector with sides, a plurality of spaced bolts extending substantially perpendicularly from said sides, a slide tray and a lamp housing, said image projection system comprising a system housing having a bottom, a top, a front, a back and sides, said front having a window therein;

shock mounting means in said system housing affixed to the bottom thereof;

projector support means extending from said shock mounting means, said projector support means comprising a plurality of bracket members having upright parts extending substantially perpendicularly to the bottom of said system housing and substantially parallel to the sides of said slide projector, the upright part of each of said bracket members having a slot formed therethrough extending along its length substantially perpendicularly to said bottom of said system housing for accommodating a corresponding one of the bolts of said slide projector, and said securing means comprises a plurality of wing nuts each threadedly coupled to a corresponding one of said bolts for releasably securing said corresponding one of said bolts at a selected distance from said bottom of said system housing in the corresponding one of said upright parts;

securing means for releasably securing the slide projector to said projector support means in a manner whereby said slide projector is selectively adjustable in position relative to said bottom of said system housing and light transmitted from said slide projector is transmitted through said window;

electrically conductive means extending through said system housing and electrically connected to said slide projector for supplying electrical energy for energizing said projector;

a screen spaced from the front of said system housing for receiving light transmitted from said slide projector and presenting an enlarged reproduction of an image on a slide in the slide tray of said slide projector;

a power supply housing mounted on the top of said system housing and having first and second spaced opposite walls each with a hole formed therethrough, a disposable dust filter removably mounted in said power supply housing over the hole of one of the first and second walls and an exhaust fan mounted in said power supply housing over the hole of the other of said first and second walls for drawing air out of said power supply housing through said hole of said other of said walls; and a power supply mounted in said power supply housing and having first and second spaced opposite walls in spaced proximity with the first and second walls, respectively, of said power supply housing each with a hole formed therethrough and a suction fan mounted in said power supply over the hole of the wall thereof in proximity with the wall of said power supply housing having the dust filter mounted thereon for drawing outside air into said power supply through said dust filter and said hole of said wall on which said suction fan is mounted.

* * * * *